United States Patent Office 2,900,017
Patented Aug. 18, 1959

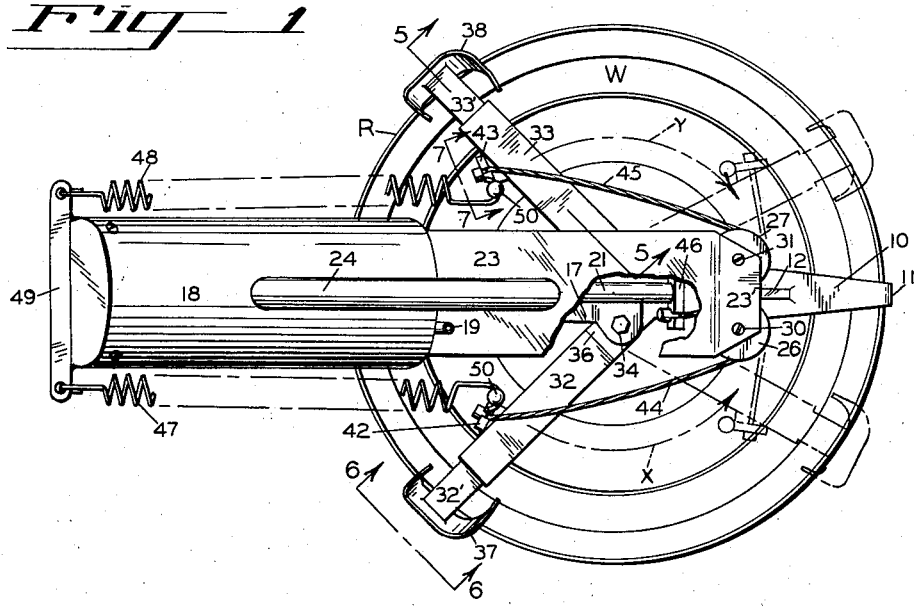

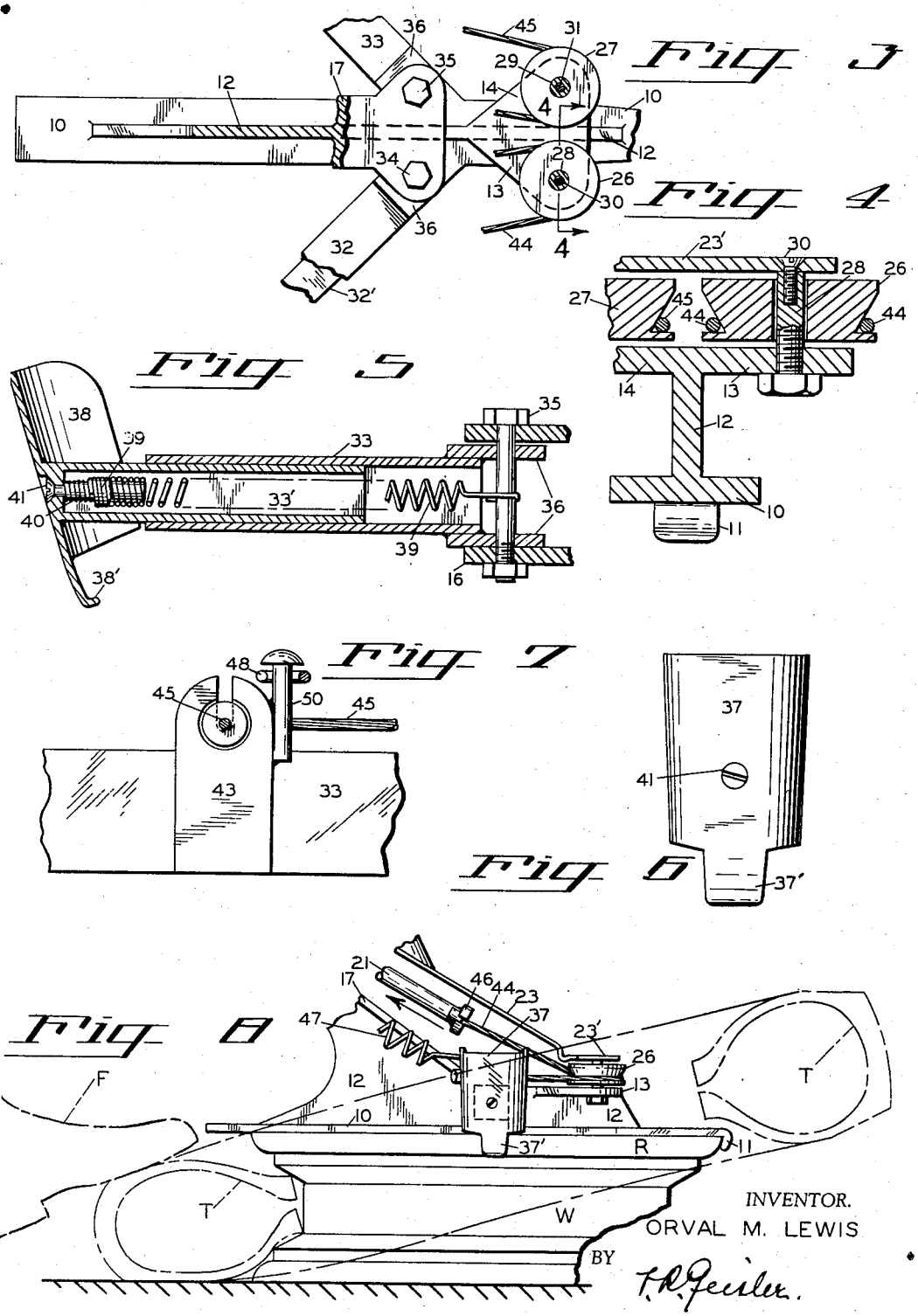

2,900,017

CIRCUMFERENTIALLY TRAVELING SHOE TYPE PORTABLE TIRE MOUNTING DEVICE

Orval M. Lewis, Sweet Home, Oreg.

Application August 12, 1957, Serial No. 677,586

4 Claims. (Cl. 157—1.22)

This invention pertains to the mounting of tires on the rims of vehicle wheels, and relates in particular to the mounting of tubeless tires on vehicle wheels of the "drop center" type.

While several machines and devices have been developed for bringing the bead of a tire into position and into locking engagement with the wheel rim, in the mounting of the tire on the wheel, a common objection to such machines and devices is that they are complicated in construction, costly, and require considerable care and effort in their operation.

An object of the present invention is to provide an improved and considerably simplified tire mounting device which can be manipulated very easily by the operator, even with the use of only one hand.

Another object of the invention is to provide a simple and practical tire mounter which will automatically adjust itself to fit different sizes of "drop center" wheels within the normal range of sizes for such wheels.

A further object of the invention is to provide an improved lightweight tire mounting device which will be portable and which is so designed as to be easily carried around by the operator.

An additional object is to provide a portable tire mounter which is adapted to be operated by being set on the wheel while the wheel rests on its side on the floor, and thus a tire mounting device which does not require the use of any stand or support, either for the wheel or for the mounting device, during the tire mounting operation.

The means by which these objects and other advantages are attained, the construction of this simplified tire mounting device, and its manner of operation, will be readily apparent from the following brief description.

In this description reference is made to the accompanying drawings in which:

Figure 1 is a top plan view of the device showing the device set in place on a wheel on which a tire is to be mounted, the tire being omitted from this figure for the sake of clarity, and the two movable and adjustable tire-mounting arms of the device being shown in full lines in their starting position, with a subsequent position indicated in broken lines;

Figure 2 is a side elevation corresponding to Figure 1 but with the tire to be mounted indicated in broken lines;

Figure 3 is a fragmentary horizontal section of the time mounting device taken on the line indicated at 3—3 in Figure 2 and drawn to a larger scale;

Figure 4 is a fragmentary section taken on line 4—4 of Figures 2 and 3 and drawn to a still larger scale;

Figure 5 is an enlarged fragmentary section on line 5—5 of Figure 1;

Figure 6 is an enlarged elevation showing the outside face of one of the shoes of the movable arms, this view being taken on line 6—6 of Figure 1;

Figure 7 is a fragmentary enlarged sectional elevation taken on line 7—7 of Figure 1; and Figure 8 is a fragmentary side elevation of the device, corresponding in part to Figure 2, illustrating the operation of the device in the mounting of the tire, the tire being indicated in broken lines.

In Figures 1, 2 and 8, the vehicle wheel, on which the tire is to be mounted, is denoted by the reference character W. The wheel is understood to be resting on its side on the floor and the rim on the top face of the wheel is indicated by R.

The tire mounting device includes a base member 10, adapted to rest on the upper face of the wheel. The length of this base member 10 is greater than the outside diameter of the rim R of the largest wheel on which the device is to be used. The forward end of this base member 10 terminates in a downwardly-extending hook 11 (Figures 1, 2, 4 and 8), which hook is placed over the wheel rim, as shown, when the device is placed on the wheel.

The base member 10 has a central upwardly-extending rib 12. At its forward end this rib terminates a short distance inwardly from the forward end of the base and downwardly-extending hook 11. A pair of integral top flanges 13 and 14 extend from opposite sides of the top of this rib near its forward end (Figures 3 and 4), and these flanges provide mounting bases for a pair of stub shafts for pulleys to be mentioned later.

The rear portion of this rib 12 is extended obliquely upwardly and rearwardly, as shown in Figure 2, to provide a bracket support for a cylinder 18. A flange member 17 extends along the top edge of this portion of the rib 12 and is welded thereto so as to combine with this portion of the rib 12 in forming a reinforced supporting bracket for the cylinder 18. The foot of this flange member 17 is widened, as shown at 17' in Figure 3, to provide upper supports for a pair of hinge bolts 34 and 35. A pair of ears 15 and 16 (Figures 2 and 5) extending from opposite sides of the base member 10, form the bottom supports for these hinge bolts 34 and 35.

A pair of hinged arm assemblies 32 and 33 (Figures 1 and 3) are mounted on the hinge bolts 34 and 35 respectively so as to swing in a horizontal plane, that is to say, in a plane parallel to the plane of the rim R of the wheel. These two arm assemblies, mounted at opposite sides of the base member 10, are identical and include telescoping members 32' and 33' respectively which carry tire-engaging shoes 37 and 38 respectively. One of these hinged arm assemblies, being arm assembly 33, is shown in detail in Figure 5.

Referring to Figure 5, a pair of top and bottom hinge plates 36 are welded on the inner end of the main member of the arm assembly 33. The outer or telescoping member 33' is also hollow and accommodates a coil spring 39. The inner end of this coil spring is attached to the hinge bolt 35. The outer end of the coil spring is secured on an adjustable plug 40 which is axially adjustable, to a limited extent, by an adjusting screw 41, the head of which is rotatable in a recess at the outer end of the telescoping member 33'. The tire-engaging shoe 38 is formed integral with, or welded to, the outer end of the telescoping member 33'. The shoe 38 is adapted to rest upon and ride on the rim R of the wheel and has an inwardly-extending hook 38' at the bottom which engages the underside of the rim R to keep the shoe from being pushed upwardly from the wheel rim. The other arm assembly 32, as previously mentioned, is identical to the arm assembly 33 and therefore need not be described. The shoe 37 of the other arm assembly 32 similarly is formed integral with, or welded to, the telescoping member 32' of that assembly.

These hinged arm assemblies 32 and 33, with their tire-engaging shoes 37 and 38 (see Figure 1) are so arranged that, when the operator sets the device in place on the wheel, with the hook 11 at the forward end of the base member 10 placed over the wheel rim as shown, each of the shoes 37 and 38 can then be brought into engagement with the wheel rim by pulling the telescoping member and shoe of each arm assembly outwardly against the force of its inside spring until the bottom of the shoe extends over the wheel rim, the arm assemblies being then in their normal or starting position shown in full lines in Figure 1.

The cylinder 18 (Figure 2) is an air cylinder and is securely welded to the top of the rigid bracket formed by the members 12 and 17 previously described. The bottom of the cylinder is also welded to an additional bracket plate 23. A handle 24 for the device, shaped preferably as shown in Figure 2, is welded to the plate 23 and is reinforced by a brace member 25 which is welded also to the bottom of the cylinder 18. An air piston 20 is mounted in the cylinder 18 and the piston rod 21 extends through an opening in the bottom of the cylinder and is slidable in a guide block 22 which is welded to the bottom of the cylinder and to the adjacent members 17 and 23.

The bottom end 23' of the plate 23 (see Figure 2) is spaced above, and bent so as to be parallel to, the flanges 13 and 14 (see also Figure 4) which extend on opposite sides from the top of the rib 12. Stub shafts 28 and 29 for a pair of pulleys 26 and 27 respectively are mounted in the flanges 13 and 14 and the bottom end 23' of the plate 23 is secured to the tops of these stub shafts by screws 30 and 31.

Flexible cables 44 and 45, having one end attached to the arm assemblies 32 and 33 respectively, pass around the pulleys 26 and 27 and have their opposite ends attached to a cross bar 46 (Figures 1, 2 and 8) carried by the piston rod 21 of the air piston 20. As a result of this cable connection between the arm assemblies and the piston rod 21, upward movement of the piston 20 and piston rod 21 will cause the arm assemblies 32 and 33 to move in opposite directions towards each other, as indicated by the directional arrows $x$ and $y$ in Figure 1. An air inlet and outlet valve 19, such as that used in vehicle tires, is mounted in the bottom of the cylinder 18, and, when the device is being operated, air under pressure is delivered into the cylinder 18, preferably from the air hose used for inflating tires, or, in the absence of such air line supply, from an ordinary manually operated air pump. This delivery of air into the cylinder 18 forces the piston 20 upwardly and results in movement of the arm assemblies towards each other, as previously described.

A pair of coil springs 47 and 48 have their lower ends connected to the arm assemblies 32 and 33 respectively and their upper ends connected to a bar 49 (Figures 1 and 2) secured to the top of the cylinder 18. The arrangement is such that, when the air under pressure in the cylinder 18 is allowed to exhaust through the valve 19, the springs 47 and 48 return the arm assemblies to the normal full line or starting position shown in Figure 1.

The cables 44 and 45, by which the arm assemblies 32 and 33 are connected with the piston rod, may be secured in place in various ways. For example, ferrules may be secured on the ends of the cables as shown and slotted lugs 42 and 43 (Figures 1 and 7) are secured to the arm assemblies 32 and 33 for engaging the ferrules at one end of the cables. Similarly the cross bar 46 on the bottom end of the piston rod 21 is shown provided with slots for the ferrules at the opposite ends of the respective cables. Obviously other means for securing the flexible cables may be employed, and small chains may also be used in place of the cables. Posts 50 are shown secured to the lugs 42 and 43 for providing suitable fastening elements for the bottom ends of the springs 47 and 48.

The two tire-engaging shoes 37 and 38 are preferably shaped as shown in Figures 1, 5 and 6 and are mounted on their respective arm assemblies so as to slope inwardly-downwardly with respect to the vertical hinge axes of the arm assemblies. The outer or tire-engaging faces of these shoes are curved laterally into two side wings and these outer faces are slightly broader at the top than at the bottom.

When the tire is to be mounted on the wheel the tire is first placed in the relative position shown by the broken lines T in Figure 2, the tire mounting device being set on the wheel in the position shown in Figures 1 and 2. Thus the portion of the tire which is opposite the front end of the mounting device will rest on the floor so that the operator, by placing his foot on this portion of the tire (as indicated at F in Figure 8), can press the top bead of this portion of the tire below the top rim R of the wheel. As apparent, this enables this pressed-down portion of the tire to move into the "drop center" of the wheel. While this portion of the tire is held pressed down by the operator's foot, the operator causes air under pressure to be delivered into the cylinder 18 through valve 19. This results in the two arm assemblies moving towards each other in opposite directions. The two tire-engaging shoes 37 and 38 engage the upper bead of the tire and then also the lower bead of the tire as the shoes slide around on the rim of the wheel towards each other. The smooth rounded faces of the shoes thrust the tire beads over the wheel rim and also cause the beads to be pushed downwardly and drawn underneath the wheel rim as a result of the downward-inward slope of the tire-engaging faces of the shoes, the tire beads sliding downwardly on the moving shoes until the last engaged portion of the tire slips off from the bottoms of the shoes and moves onto the wheel. The hooks 37' and 38' at the bottom of the shoes, as previously mentioned, prevent any possibility of the shoes being thrust upwardly off of the wheel rim while the shoes forcibly engage the tire beads.

By the time the two shoes have been moved close to the front end of the base member 10 the tire will be entirely mounted on the wheel. In the device as illustrated each arm assembly and shoe moves through an arc of approximately 140° so that the two shoes move over approximately 280° of the circumference of the top bead of the tire. While this distance of travel of the two shoes may vary more or less in different devices embodying this invention, it is apparent that each shoe must move through an arc greater than 90° and less than 180°. This forward movement of the two arm assemblies and their tire-engaging shoes requires considerably less than a minute of time when air is delivered into the cylinder 18 by means of the air hose available in practically every garage and service station, and thus the entire tire-mounting operation is accomplished in a few minutes. The device is then easily slipped off the wheel rim after the tire is in place on the wheel and, with the tire mounting completed, the operator, by opening the valve 19, releases the air from the cylinder 18 and allows the arm assemblies 32 and 33 to be moved back to their starting positions under the force of the springs 47 and 48.

Preferably, but not necessarily, the tire beads are first brushed with a vegetable grease to facilitate the relative sliding of the beads with respect to the shoes and to facilitate the slipping of the beads into place on the wheel. However, due to the smooth surface and shape of the shoes, there is no possibility whatever of any damage to the tire beads or to the air seals of tubeless tires, as a result of the mounting operation, and even without the use of any grease coating no appreciable wear on the tire beads occurs as a result of this very brief mounting operation.

It will be apparent from the drawings that this tire mounting device, when constructed as described, will not be too heavy to be carried easily by the operator from place to place and will also be small enough so that it can easily be stored in the luggage compartment of an ordinary automobile.

Minor modifications in the construction of the device would of course be possible within the scope of the invention, but the construction as illustrated and described is considered to be the preferred manner of carrying out the invention.

I claim:

1. In a tire mounting device, a base member adapted to be placed on the top of a vehicle wheel when the wheel is resting on its side on the ground, said base member being longer than the diameter of the outer periphery of the top side rim of said wheel, means at the front end of said base member for engaging said wheel rim, a pair of arm assemblies hinged at opposite sides of said base member, a tire-engaging shoe adjustably carried on each of said arm assemblies and engaging the periphery of said wheel rim, spring means in said assemblies pulling said shoes against said wheel rim periphery, an element on each shoe extending under the wheel rim for holding the shoe down on said wheel rim while enabling said shoe to be moved along said rim, and means for forcibly moving said arm assemblies and therewith said shoes forwardly towards each other and towards said front end of said base member through arms in excess of 90° but less than 180°.

2. In a device for mounting a tire on a vehicle wheel, a base member adapted to be placed on the top side of the vehicle wheel when the wheel is resting on its side on the ground, said base member being longer than the diameter of the outer periphery of the top side rim of said wheel, a downwardly-extending hook at the front end of said base member for engaging said wheel rim, a pair of adjustable arm assemblies hinged at opposite sides of said base member for movement in the plane of said base member parallel to the plane of said rim, each of said arm assemblies including a main member and an outer member telescopically mounted in said main member, a tire-engaging shoe secured on the outer end of each of said outer members of said arm assemblies, the outer face of each shoe sloping downwardly and inwardly, means on the bottom of each shoe for holding the shoe down on said wheel rim while enabling said shoe to be moved along said rim, means for forcibly moving said arm assemblies and therewith said shoes forwardly towards each other and towards said front end of said base member through arcs in excess of 90° but less than 180°, said latter mentioned means including an air cylinder and piston and flexible elements connecting said arm assemblies respectively with the piston rod for said piston, and springs normally maintaining said arm assemblies and shoes spaced an arcuate distance in excess of 90° from said front end of said base member.

3. A tire mounting device including a base member adapted to be placed on the top side of a vehicle wheel when the wheel is resting on its side on the ground, said base member being longer than the diameter of the outer periphery of the top side rim of said wheel, means at the front end of said base member engageable with said wheel rim, a pair of identical arm assemblies hinged at opposite sides of said base member for movement in the plane of said base member parallel to the plane of said rim, each of said arm assemblies including a main member and an outer member telescopically mounted in said main member, spring means connected with said outer member for pulling said outer member inwardly with respect to said main member but enabling said outer member to be adjustable outwardly against the force of said spring means, a tire-engaging shoe secured on the end of each of said outer members of said arm assemblies, a hook on the bottom of each shoe for holding the shoe down on said wheel rim while enabling said shoe to be moved along said rim, means for forcibly moving said arm assemblies and therewith said shoes forwardly towards each other and towards said front end of said base member through arcs in excess of 90°, said latter mentioned means including an air cylinder and piston and flexible elements connecting said arm assemblies respectively with the piston rod for said piston, a rigid support for said cylinder on said base member, and spring means normally maintaining said arm assemblies and shoes spaced an arcuate distance in excess of 90° from said front end of said base member.

4. A device for mounting a tire on a vehicle wheel consisting of a base member adapted to be placed on the top of the vehicle wheel when the wheel is resting on its side on the ground, said base member being longer than the diameter of the outer periphery of the top side rim of said wheel, a downwardly extending hook at the front end of said base member for engaging said wheel rim, a pair of identical and adjustable arm assemblies hinged at opposite sides of said base member for movement in the plane of said base member parallel to the plane of said rim, each of said arm assemblies including a main member and an outer member telescopically mounted in said main member, a spring in said main member connected with said outer member for pulling said outer member inwardly with respect to said main member but enabling said outer member to be adjustable outwardly against the force of said spring, means for adjusting the tension of said spring in each of said arm assemblies, a tire-engaging shoe secured on the outer end of each of said outer members of said arm assemblies, the outer face of each shoe sloping downwardly and inwardly, a hook on the bottom of each shoe for holding the shoe down on said wheel rim while enabling said shoe to be moved along said rim, means for forcibly moving said arm assemblies and therewith said shoes forwardly towards each other and towards said front end of said base member through arcs in excess of 90° but less than 180°, said latter mentioned means including an air cylinder and piston and flexible elements connecting said arm assemblies respectively with the piston rod for said piston, a rigid support for said cylinder on said base member holding said cylinder spaced above said base member and sloping upwardly and rearwardly with respect to said base member, springs normally maintaining said arm assemblies and shoes spaced an arcuate distance in excess of 90° from said front end of said base member; and a handle for carrying said device located above said base member.

References Cited in the file of this patent

UNITED STATES PATENTS

| 1,025,987 | Long | May 14, 1912 |
| 1,497,034 | Singleton | June 10, 1924 |
| 2,439,615 | Smith | Apr. 13, 1948 |
| 2,665,747 | Harrison | Jan. 12, 1954 |